United States Patent [19]
Huber et al.

[11] Patent Number: 5,513,859
[45] Date of Patent: May 7, 1996

[54] SEALING ELEMENT

[75] Inventors: Wolfgang Huber, Lieboch; Erich Kleinhappl, Weinitzen; Wolf-Dietrich Steinböck; Helmut Zach, both of Graz, all of Austria

[73] Assignee: AVL Medical Instruments AG, Schaffhausen, Switzerland

[21] Appl. No.: 513,346

[22] Filed: Aug. 10, 1995

Related U.S. Application Data

[63] Continuation of Ser. No. 151,813, Nov. 12, 1993, abandoned.

[30] Foreign Application Priority Data

Nov. 12, 1992 [AT] Austria ................................. 2237/92

[51] Int. Cl.$^6$ ................................................ F16J 9/00
[52] U.S. Cl. ......................... 277/207 A; 277/167.5; 277/186; 285/334.3
[58] Field of Search ........................... 277/12, 167.5, 277/169, 171, 172, 186, 207 A, 212 C, 178, 225; 285/334.3, 334.2, 336

[56] References Cited

U.S. PATENT DOCUMENTS

| | | | |
|---|---|---|---|
| 2,789,844 | 4/1957 | Kessler | 277/169 |
| 3,191,949 | 6/1965 | Lansky et al. | 277/168 |
| 3,307,854 | 3/1967 | Hatfield | 277/178 |
| 3,367,682 | 2/1968 | Meriano | 277/167.5 |
| 3,664,676 | 5/1972 | Peterson | 277/186 |
| 4,303,251 | 12/1981 | Harra et al. | 277/167.5 |
| 4,477,092 | 10/1984 | Bush | 277/167.5 |

FOREIGN PATENT DOCUMENTS

| | | |
|---|---|---|
| 0297082 | 12/1990 | European Pat. Off. . |
| 3818148 | 1/1989 | Germany . |

*Primary Examiner*—Daniel G. Depumpo
*Attorney, Agent, or Firm*—Watson Cole Stevens Davis

[57] ABSTRACT

A fluid-tight connection of capillary channels in components which are detachable from each other is established with the use of a sealing element. In order to compensate for slight deviations between the channel axes during the coupling of the components without creating any dead spaces, the sealing element is configured as a piece of flexible tubing adapting to the course of the capillary channels during component coupling, and a mounting element anchored in one of the components.

4 Claims, 1 Drawing Sheet

PRIOR ART

SEALING ELEMENT

CROSS-REFERENCE TO RELATED APPLICATION

This is a continuation of application Ser. No. 08/151,183, filed Nov. 12, 1993, now abandoned.

BACKGROUND OF THE INVENTION

The invention relates to a sealing element for a fluid-tight connection of capillary channels running in components which are detachable from each other.

DESCRIPTION OF THE PRIOR ART

Such sealing elements are often used in analyzing apparatuses, in particular for the analysis of body fluids, and are placed at the coupling site of individual measuring modules, measuring electrodes, or fittings, where they provide a fluid-tight connection with the respective fluid feeding system. Such an analyzing apparatus is described in EPA 0 297 082, for instance.

Usually such a sealing connection is obtained with the use of disk-shaped rubber gaskets, i.e., O-rings or rings with a square cross-section.

In DE-PS 38 18 148, for example, an analyzer with several measuring modules is described, whose capillary channels are detachably connected at the coupling sites by means of such "square rings".

If square rings are used, the interior diameter of the ring must be larger than the diameter of the channel in order to compensate for deviations between the axes of the adjoining channels. This will result in excessively large spaces in the course of the channels, in which fluid remains will collect. Such remains are undesirable in applications, (a) where a following fluid of different composition mixes with the remains of the previous fluid charge, thus changing its composition, and where changes of this kind should be kept at a minimum, or should be reproducible (such as in equipment for the analysis of body fluids);

(b) where the fluid remains collecting about the sealing element become saturated with the gas or air passed through immediately afterwards (tonometry), and where the gas absorbed in this manner is given off to the subsequent fluid charge, thus changing its gas content (such as in analyzing equipment with blood gas electrodes for measuring the $pO_2$ and $pCO_2$ contents in blood);

(c) where it is desirable that the channels should be dried as quickly as possible by blowing through an amount of air. (Whereas a channel with a straight passage will dry very quickly, the fluid volumes remaining in the dead spaces take a long time to dry.)

The disadvantage of O-rings is that a capillary gap will remain around the capillary channel, which will fill with fluid and cannot be drained anymore. These fluid remains in the capillary gap will mix with the fluids admitted afterwards in an unreproducible way. Another disadvantage is the stepped transition from one channel to the next if the channel axes do not coincide. Such steps will also produce dead spaces holding fluid remains after draining.

The fluid volumes retained in this instance are as undesirable as described above (cf items a to c).

SUMMARY OF THE INVENTION

It is an object of the invention to produce an inexpensive, reliable, detachable, fluid-tight sealing element for the connection of capillary channels with a small diameter, which are to be coupled to one another, the channel passage in its entirety being as homogeneous as possible. The sealing element should be capable of both compensating for deviations between the channel axes of up to one third of the channel diameter, and presenting a minimum surface towards the channel.

In the invention this object is achieved by configuring the sealing element as a piece of flexible tube adapting to the course of the capillary channels when the components are coupled, and a mounting element anchored in one of the components. This will guarantee a reliable seal, where deviations between the channel axes may be compensated for without any step, the resulting continuous course of the channels largely preventing the formation of noxious volumes or dead spaces. The interior diameter of such a sealing element need be only slightly larger than that of the channel. Furthermore, the sealed transition between the individual components is free of gaps, preventing fluid remains from leaving the space between the components or entering it with changing suction or pressure conditions in the capillary channel.

In the invention the two ends of the flexible tube project into identical recesses concentric with the capillary channels in the two detachable components, where they are in contact with sealing surfaces in the recesses. Each recess is bounded by a sealing surface normal to the axis of the capillary channel, and an adjacent sealing surface enlarging conically.

The sealing element is safely fastened to one of the components by means of the mounting element, which is preferably made integral with the flexible tube. When the components are separated the sealing element will remain in place.

A variant of the invention provides that the mounting element have a ring-shaped body anchored in a ring-shaped groove of one of the components, which is connected to the flexible tube via an annular flange.

According to the invention suitable materials for the sealing element are elastomers, such as NBR (acrylonitrile butadiene rubber), IIR (isoprene-isobutylene copolymer rubber), EPDM (ethylene-propylene rubber), bromobutyl rubber, and silicone rubber. It is recommended that the above materials have a Shore hardness of 40 to 50.

The two detachable components may be provided with fitting and guiding surfaces to ease stresses on the sealing element. The components to be sealed may be made of metal or synthetic material.

BRIEF DESCRIPTION OF THE DRAWINGS

Following is a description of the invention with reference to the accompanying drawings, in which.

DETAILED DESCRIPTION OF THE PREFERRED EMBODIMENT VS. STATE-OF-THE-ART VARIANTS

Figure 1:
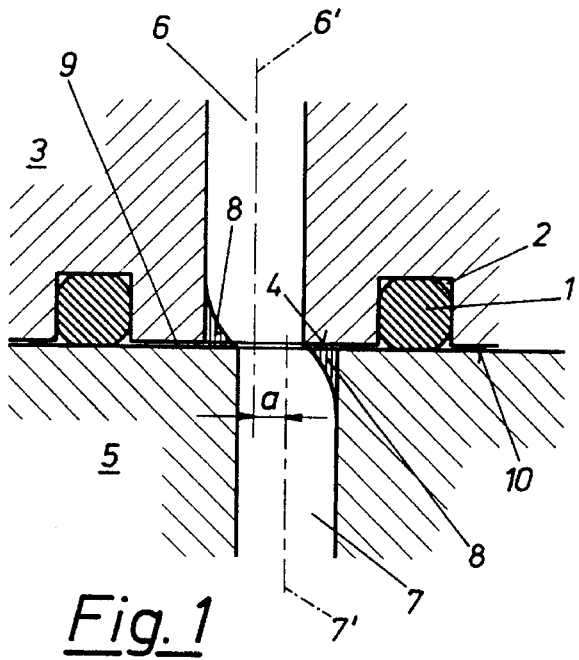
FIGS. 1 and 2 show state-of-the art sealing elements.

The sealing element 1 presented in FIG. 1 is a conventional O-ring seal, where the sealing element is held in a ring-shaped groove 2 of one of the detachable components 3, and is pressed against a sealing surface 4 of the other component 5. When components 3 and 5 are put together, the two channel axes 6' and 7' of capillary channels 6 and 7 may deviate from each other by an amount a, which will not affect the efficiency of the seal, but will lead to dead spaces 8 where the transition between the capillary channels forms a step. In these dead spaces 8 fluid remains will collect. Besides, an undesirable capillary gap 9 will form between the sealing surfaces 4 and 10 of the two components 3 and 5, which will extend up to the sealing element 1 and hold more fluid remains that cannot be washed out.

Figure 2:
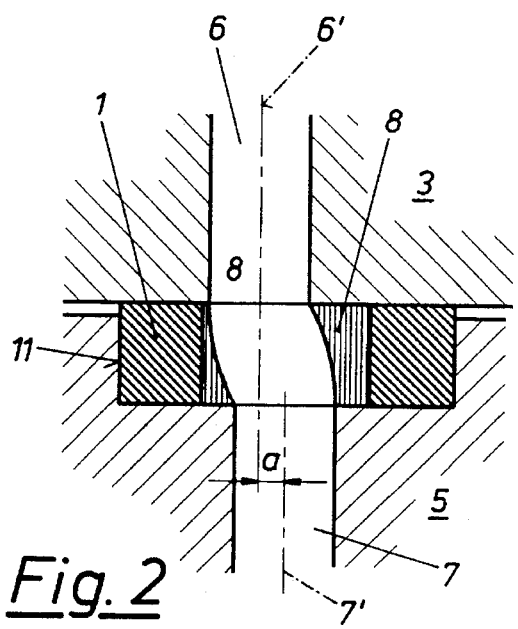
Figure 3:
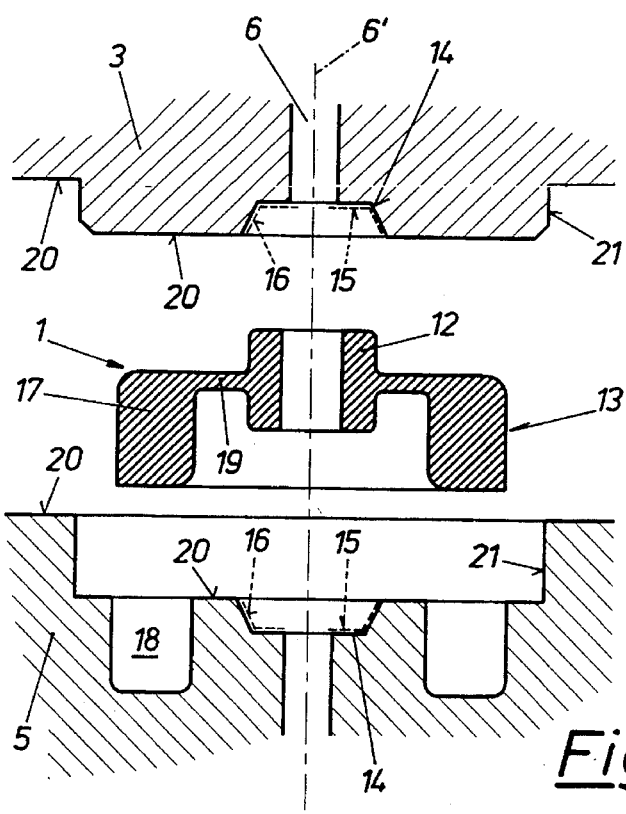
FIG. 3 shows a section of a sealing element according to the invention, which is to be fitted into components that are detachable from each other.
Figure 4:
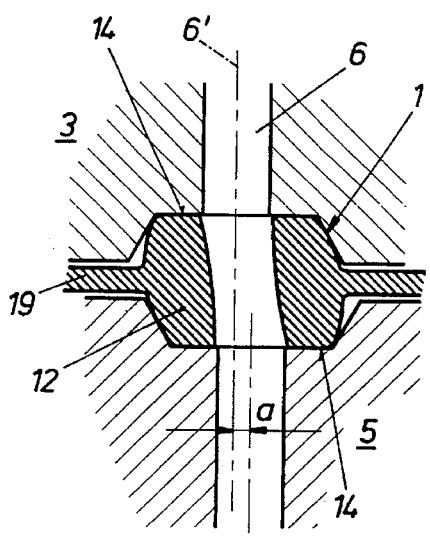
FIG. 4 shows details of the fitted sealing element of FIG. 3.

The connection of capillary channels may also be effected by means of sealing elements as shown in FIG. 2, i.e., using sealing rings with a square cross-section. To compensate for deviations a between the channel axes 6' and 7' during the coupling of components 3 and 5, the sealing element 1 placed in an annular recess 11 must have an interior diameter which is greater than that of the adjacent capillary channels 6 and 7. This will also result in undesirable dead spaces 8, in which fluid remains will collect.

The sealing element 1 proposed by the invention practically excludes all dead volumes or dead spaces, by providing a flexible tube 12 which will adapt to the course of the capillary channels 6 and 7 during the coupling of components 3 and 5 without forming a step, compensating deviations between the channel axes 6', 7' off up to one third of the channel diameter (approx. 0.6 mm). The flexible tube 12 is provided with a mounting element 13, preferably molded integral with it, which element 13 is anchored in component 5. To establish a tight connection of capillaries 6 and 7, the two ends of the flexible tube 12 project into identical recesses 14 concentric with capillary channels 6, 7, where they are in contact with sealing surfaces 15 and 16. Each recess 14 has a sealing surface 15 normal to the respective axis 6', 7', which is bordering on a conically widening sealing surface 16.

The mounting element 13 is anchored by means of a ring-shaped body 17 in a ring-shaped groove 18 of component 5, and is connected to the flexible tube 12 of the sealing element 1 via an annular flange 19. When components 3 and 3 are separated, the sealing element 1 will thus remain in component 5. The two components 3, 5 could be measuring modules or measuring electrodes of an analyzing unit.

To protect the sealing element 1 against undue pressure forces and shearing stresses during coupling, components 3 and 5 are provided with fitting surfaces 20 and guiding surfaces 21.

We claim:

1. A combination of:

a first component which provides a first external fitting surface having a first recess therein and a first internal capillary channel which communicates with said first recess, a second component which provides a second external fitting surface having a second recess therein, a third recess within said second recess, a second internal capillary channel which communicates with said third recess, and an annular groove within said second recess that surrounds said third recess, and a one-piece sealing element for providing a fluid-tight seal between said first and second capillary channels when said first and second components are attached together, said sealing element comprising a flexible tube portion which is positioned within said third recess and is positionable within said first recess to communicate said first and second capillary channels when said first and second components are attached together, and a ring-shaped mounting portion which is fixedly positioned within said annular ring-shaped groove to fixedly attach said sealing element to said second component.

2. The combination of claim 1, wherein said first and second components are measuring modules of an analyzing unit.

3. The combination of claim 1, wherein said one-piece sealing element is made of at least one material selected from the group consisting of acrylonitrile butadiene rubber, isoprene-isobutylene copolymer rubber, ethylene-propylene rubber, bromobutyl rubber and silicone rubber.

4. The combination of claim 1, wherein said one-piece sealing element includes an annular flange connecting said tube portion and said mounting portion thereof.

* * * * *